US012614966B2

(12) United States Patent
Kumazawa

(10) Patent No.: US 12,614,966 B2
(45) Date of Patent: Apr. 28, 2026

(54) SEMICONDUCTOR DEVICE

(71) Applicant: FUJI ELECTRIC CO., LTD.,
Kawasaki (JP)

(72) Inventor: Yuki Kumazawa, Matsumoto-city (JP)

(73) Assignee: FUJI ELECTRIC CO., LTD.,
Kawasaki (JP)

( * ) Notice: Subject to any disclaimer, the term of this
patent is extended or adjusted under 35
U.S.C. 154(b) by 198 days.

(21) Appl. No.: 18/517,977

(22) Filed: Nov. 22, 2023

(65) Prior Publication Data

US 2024/0258898 A1     Aug. 1, 2024

(30) Foreign Application Priority Data

Jan. 26, 2023     (JP) ................................. 2023-010427

(51) Int. Cl.
| | |
|---|---|
| *H02M 1/00* | (2007.01) |
| *H02M 1/088* | (2006.01) |
| *H02M 1/32* | (2007.01) |
| *H02M 7/5387* | (2007.01) |

(52) U.S. Cl.
CPC ......... *H02M 1/0009* (2021.05); *H02M 1/088*
(2013.01); *H02M 1/32* (2013.01); *H02M*
*7/5387* (2013.01)

(58) Field of Classification Search
CPC ...... H02M 1/0009; H02M 1/088; H02M 1/32;
H02M 7/5387
See application file for complete search history.

(56) References Cited

U.S. PATENT DOCUMENTS

| | | | |
|---|---|---|---|
| 2014/0321012 A1 | 10/2014 | Nakayama | |
| 2016/0011266 A1* | 1/2016 | Osanai ................... | G01R 31/42 |
| | | | 324/762.01 |
| 2018/0206359 A1* | 7/2018 | McPherson .......... | H05K 5/0069 |

FOREIGN PATENT DOCUMENTS

JP                5717915 B2     5/2015

* cited by examiner

*Primary Examiner* — Jue Zhang
(74) *Attorney, Agent, or Firm* — Rabin & Berdo, P.C.

(57) ABSTRACT

A semiconductor device includes an output circuit and a switching element. The output circuit includes a switching element, a sense switching element, and a shunt breaking circuit. When an upper arm side switching element changes from an on-state to an off-state, a regenerative current flows from a load because of the regenerative operation of the load. In the output circuit, the shunt breaking circuit is located on the low potential side of a sense MOSFET in the sense switching element. As a result, a shunt of the regenerative current, which is generated at the time of the regenerative operation of the load, to the sense switching element is cut off by the shunt breaking circuit.

20 Claims, 16 Drawing Sheets

SEMICONDUCTOR DEVICE

CROSS-REFERENCE TO RELATED APPLICATION

This application is based upon and claims the benefit of priority of the prior Japanese Patent Application No. 2023-010427, filed on Jan. 26, 2023, the entire contents of which are incorporated herein by reference.

BACKGROUND OF THE INVENTION

1. Field of the Invention

The embodiment discussed herein relates to a semiconductor device.

2. Background of the Related Art

Silicon-insulated gate bipolar transistors (Si-IGBTs), which are silicon (Si)-element IGBTs, have been used in power modules of semiconductor devices. In recent years, however, there has been a growing tendency to use silicon carbide-metal oxide-semiconductor field-effect transistors (SiC-MOSFETs), which are silicon carbide (SiC)-element MOSFETs, in place of Si-element IGBTs.

Such an SiC-MOSFET has a high dielectric breakdown field strength, compared with an IGBT. Accordingly, such an SiC-MOSFET has a high breakdown voltage. Furthermore, with such an SiC-MOSFET, it is possible to make impurity concentration higher and make an active layer thinner. This leads to high efficiency and high-speed switching operation. As a result, it is expected that power dissipation is reduced.

On the other hand, semiconductor devices in which an SiC-MOSFET is used as a main switch are applied to power converters, such as three-phase inverters which supply power to a load such as a motor. Furthermore, when the load is in a short-circuit state, there is a possibility that an excessive current larger than current flowing at normal operation time flows and that a failure occurs in the main switch or a peripheral circuit. Accordingly, a sense switch is located as one of fault tolerant design for a semiconductor device for detecting overcurrent.

For example, the following technique was proposed as a related art. When a reverse overcurrent detection circuit detects reverse overcurrent, control is exercised so as to turn on a main switching element and a sense switching element (see, for example, Japanese Patent No. 5717915).

A built-in diode is attached to a switching element using an SiC-MOSFET. With a semiconductor device in which such an SiC-MOSFET is used in a main switch and a sense switch, it is assumed that a regenerative current is generated in a load. Then part of the regenerative current flows into the inside of a control IC which drives the main switch and the sense switch, and a reverse voltage is generated in the control IC.

FIG. 16 is a view for describing the generation of a reverse voltage caused by a shunt of a regenerative current. A semiconductor device 100 includes an upper arm circuit 114, a lower arm circuit 124, and a load L connected to one another via a node n. The lower arm circuit 124 has an output circuit 120 and a control IC 121. The output circuit 120 includes a main switch sw1b and a sense switch sw2b. The upper arm circuit 114 includes the same components that the lower arm circuit 124 includes.

The main switch sw1b which operates the load L has a main MOSFET 1b1. Furthermore, the main switch sw1b has a built-in diode Db1 connected in inverse parallel with the main MOSFET 1b1. Similarly, the sense switch sw2b which detects sense current has a sense MOSFET 1b2. Furthermore, the sense switch sw2b has a built-in diode Db2 connected in inverse parallel with the sense MOSFET 1b2. An SiC-MOSFET is used as the main MOSFET 1b1 and the sense MOSFET 1b2.

In the output circuit 120, a drain of the main MOSFET 1b1 is connected to a cathode of the built-in diode Db1, a drain of the sense MOSFET 1b2, a cathode of the built-in diode Db2, and the node n. The node n is connected to a current output terminal of a switching element (not illustrated) in the upper arm circuit 114 and one end of the load L.

A gate of the main MOSFET 1b1 is connected to a gate of the sense MOSFET 1b2 and an output terminal OUT of the control IC 121. A source of the sense MOSFET 1b2 is connected to an anode of the built-in diode Db2 and is connected via an input terminal IN of the control IC 121 to one end of a sense resistor Rs. The other end of the sense resistor Rs is connected to a source of the main MOSFET 1b1, an anode of the built-in diode Db1, and the other end of the load L.

The main switch sw1b and the sense switch sw2b are switching-driven by a drive signal ds output from the output terminal OUT of the control IC 121. Furthermore, the control IC 121 receives at the input terminal IN a sense current Is flowing from the sense switch sw2b and converts the sense current Is into a voltage signal by the sense resistor Rs. In addition, on the basis of the voltage signal, the control IC 121 detects at a subsequent stage overcurrent which may occur in the main switch sw1b.

When a switching element (not illustrated) located in an output circuit of the upper arm circuit 114 changes from an on-state to an off-state in the semiconductor device 100 having the above structure, a regenerative current IF is generated in the load L because of the regenerative operation of the load L. Furthermore, part of the regenerative current IF flows via the diode Db2 attached to the sense switch sw2b. If an IGBT is used as a switching element, then part of the regenerative current IF does not flow via a built-in diode because an IGBT does not have a built-in diode.

With the semiconductor device 100 having the above structure, however, a MOSFET is used in the sense switch sw2b. As a result, part of the regenerative current IF generated at the time of the regenerative operation flows via the built-in diode Db2 attached to the sense switch sw2b.

In this case, as illustrated in FIG. 16, a shunt current I0, which is part of the regenerative current IF, is input to the inside of the control IC 121 which drives the sense MOSFET 1b2. As a result, a reverse voltage VR is generated inside the control IC 121. The reverse breakdown voltage of the control IC 121 is low. Accordingly, when the reverse voltage VR is generated, there is a risk that the control IC 121 fails.

The generation of a reverse voltage in the control IC 121 included in the lower arm circuit 124 has been described. However, a reverse voltage may be generated in the same way in a control IC included in the upper arm circuit 114 due to a shunt of a regenerative current.

SUMMARY OF THE INVENTION

According to an aspect, there is provided a semiconductor device, including: a lower arm circuit including a lower arm side output circuit including: a lower arm side switching element that is switching-controlled by a lower arm side control circuit and that supplies a power to a load; a lower arm side current monitoring element that is switching-controlled by the lower arm side control circuit and that monitors a current flowing through the lower arm side switching element; and a lower arm side shunt breaking circuit electrically connected to a low potential side terminal of the lower arm side current monitoring element; and an upper arm side switching element connected in series with the lower arm side switching element, wherein the lower arm side shunt breaking circuit cuts off a shunt of a regenerative current flowing from the load to the lower arm side current monitoring element upon the upper arm side switching element changing from an on-state to an off-state, the load being connected to a connection point of the upper arm side switching element and the lower arm side switching element at one side thereof, and connected to a low potential side terminal of the lower arm side switching element at another side thereof.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
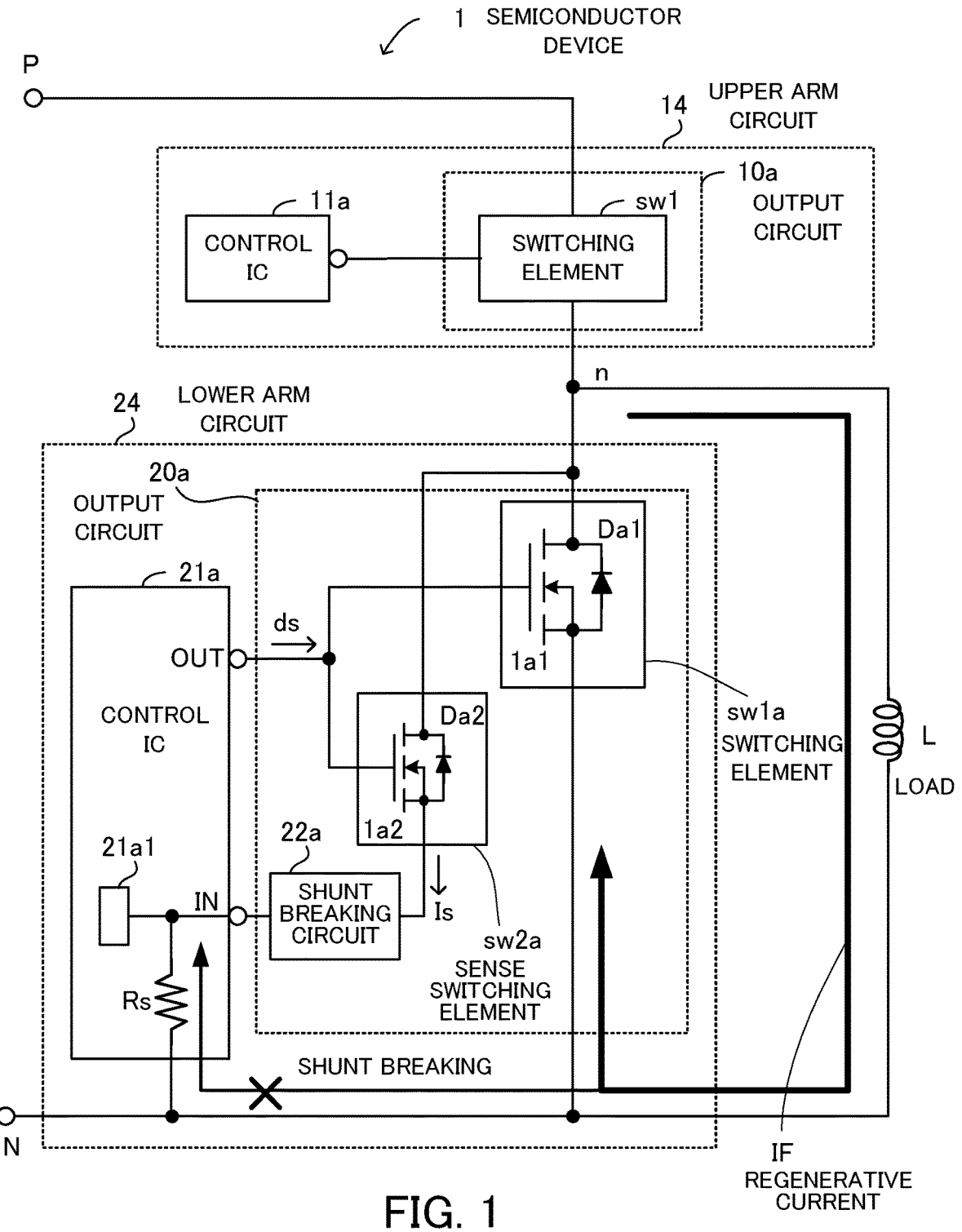
FIG. 1 is a view for describing an example of a semiconductor device.

An embodiment will now be described with reference to the accompanying drawings. Components in the specification and the drawings having substantially the same function are marked with the same reference numeral. By doing so, a duplicate description may be omitted.

FIG. 1 is a view for describing an example of a semiconductor device. A semiconductor device 1 includes an upper arm circuit 14, a lower arm circuit 24, and a load L. The upper arm circuit 14 includes an output circuit 10a (upper arm side output circuit) and a control IC 11a (upper arm side control circuit). The lower arm circuit 24 includes an output circuit 20a (lower arm side output circuit) and a control IC 21a (lower arm side control circuit). Furthermore, the upper arm circuit 14 and the lower arm circuit 24 are connected to the upper arm side and the lower arm side, respectively, via a node n.

The output circuit 10a includes a switching element sw1 (upper arm side switching element). The output circuit 20a includes a switching element sw1a (lower arm side switching element), a sense switching element sw2a (lower arm side current monitoring element), and a shunt breaking circuit 22a. Furthermore, the control IC 21a includes a sense resistor Rs and a current detection circuit 21a1.

The switching element sw1a which operates the load L has a main MOSFET 1a1 and a built-in diode Da1 connected in inverse parallel with the main MOSFET 1a1 is attached. Similarly, the sense switching element sw2a which detects a sense current has a sense MOSFET 1a2 and a built-in diode Da2 connected in inverse parallel with the sense MOSFET 1a2 is attached. An SiC-MOSFET is used as the main MOSFET 1a1 and the sense MOSFET 1a2.

In the output circuit 20a, a drain of the main MOSFET 1a1 is connected to a cathode of the built-in diode Da1, a drain of the sense MOSFET 1a2, a cathode of the built-in diode Da2, and the node n. The node n is connected to a current output terminal (low potential side terminal) of a switching element sw1 and one end (high potential side terminal) of the load L.

A gate of the main MOSFET 1a1 is connected to a gate of the sense MOSFET 1a2 and an output terminal OUT of the control IC 21a. A source (low potential side terminal) of the sense MOSFET 1a2 is connected to an anode of the built-in diode Da2 and one terminal of the shunt breaking circuit 22a. The other terminal of the shunt breaking circuit 22a is connected via an input terminal IN of the control IC 21a to an input end of the current detection circuit 21a1 and one end of a sense resistor Rs. The other end of a sense resistor Rs is connected to a source of the main MOSFET 1a1, an anode of the built-in diode Da1, and the other end of the load L.

The main MOSFET 1a1 and the sense MOSFET 1a2 are switching-driven by a drive signal ds output from the output terminal OUT of the control IC 21a. Furthermore, the control IC 21a receives at the input terminal IN a sense current Is flowing from the sense MOSFET 1a2 and converts the sense current Is to a voltage signal by the sense resistor Rs for sense current detection. In addition, on the basis of the voltage signal, the current detection circuit 21a1 detects overcurrent which may occur in the main MOSFET 1a1.

When the switching element sw1 located in the upper arm side output circuit 10a changes from an on-state to an off-state in the semiconductor device 1 having the above structure, a regenerative current IF is generated in the load L because of the regenerative operation of the load L.

In the output circuit 20a, the shunt breaking circuit 22a is located between the sense MOSFET 1a2 and the sense resistor Rs. Accordingly, in this case, a shunt of the regenerative current IF, which is generated at the time of the regenerative operation of the load L, to the sense MOSFET 1a2 is cut off by the shunt breaking circuit 22a.

That is to say, a shunt of the regenerative current IF does not occur and the regenerative current IF flows only along a regular route (flow from the load L in a forward direction of the built-in diode Da1). As a result, generation of a reverse voltage caused by a shunt of the regenerative current IF is prevented. This prevents a reverse voltage from being applied to the control IC 21a.

The structure and operation of a concrete example of the semiconductor device 1 will now be described in detail. In the following description, it is assumed that an SiC-MOSFET is used as a MOSFET.

Figure 2:
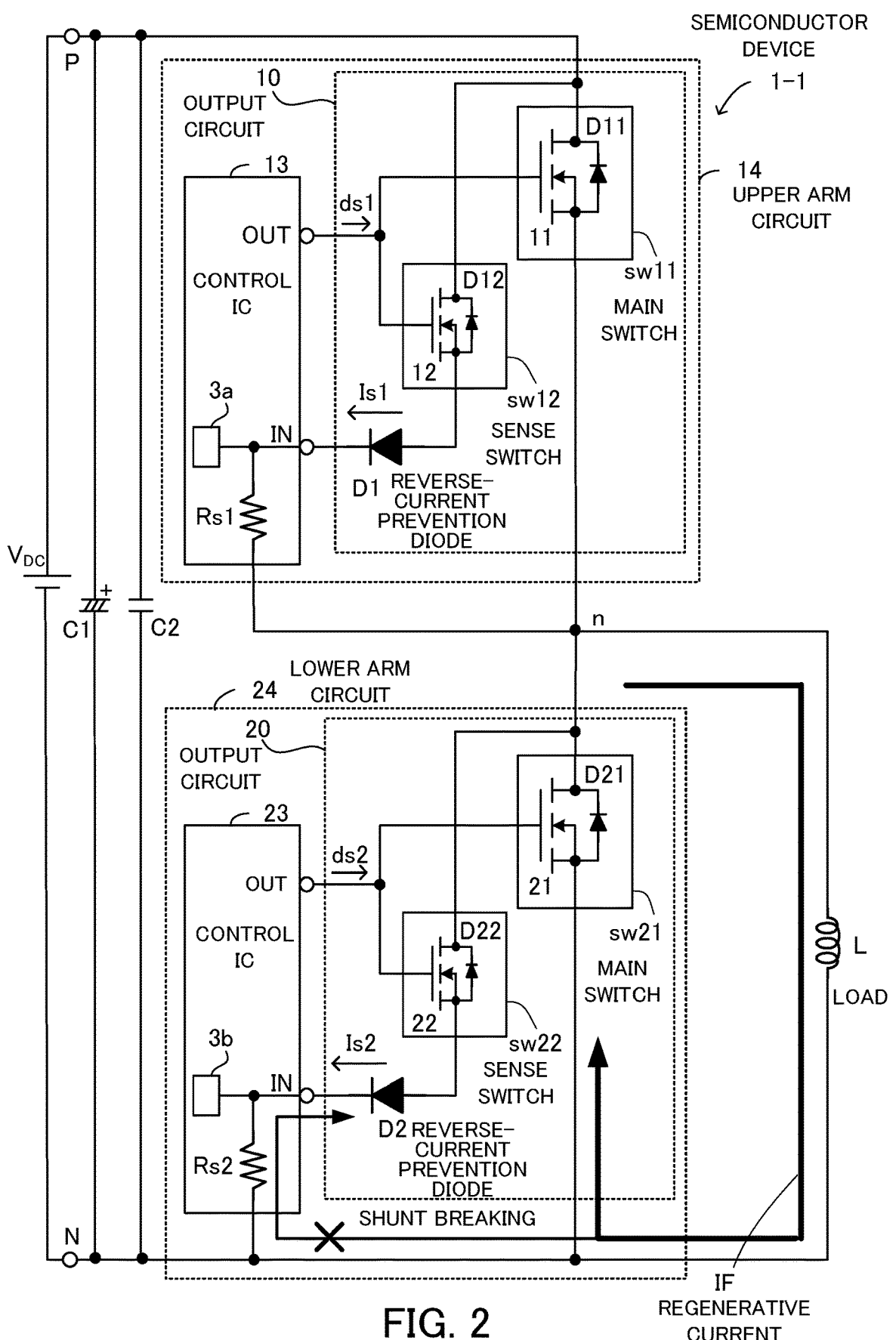
FIG. 2 illustrates an example of the structure of a semiconductor device.

FIG. 2 illustrates an example of the structure of a semiconductor device. A semiconductor device 1-1 includes an upper arm circuit 14, a lower arm circuit 24, a load L, a capacitor C1 (polarized), a capacitor C2, and a power supply section $V_{DC}$. The upper arm circuit 14 and the lower arm circuit 24 are located on the upper arm side and the lower arm side, respectively, and are connected via a node n. Furthermore, the load L is an inductive load, for example. One end (first end) of the load L is connected to the node n and the other end (second end) of the load L is connected to a negative electrode side terminal of the power supply section $V_{DC}$.

The upper arm circuit 14 includes an output circuit 10 and a control IC 13. The output circuit 10 includes a main switch sw11, a sense switch sw12, and a reverse-current prevention diode D1. The reverse-current prevention diode D1 corresponds to an upper arm side shunt breaking circuit. The main switch sw11 has a main MOSFET 11 and a built-in diode (first upper built-in diode) D11 connected in inverse parallel with the main MOSFET 11 is attached.

Similarly, the sense switch sw12 which detects a sense current has a sense MOSFET 12 and a built-in diode (second upper built-in diode) D12 connected in inverse parallel with the sense MOSFET 12 is attached. Furthermore, the control IC 13 includes a sense resistor Rs1 and a current detection circuit 3a.

The lower arm circuit 24 includes an output circuit 20 and a control IC 23. The output circuit 20 includes a main switch sw21, a sense switch sw22, and a reverse-current prevention diode D2. The reverse-current prevention diode D2 corresponds to a lower arm side shunt breaking circuit. The main switch sw21 has a main MOSFET 21 and a built-in diode (first lower built-in diode) D21 connected in inverse parallel with the main MOSFET 21 is attached.

Similarly, the sense switch sw22 which detects a sense current has a sense MOSFET 22 and a built-in diode (second lower built-in diode) D22 connected in inverse parallel with the sense MOSFET 22 is attached. Furthermore, the control IC 23 includes a sense resistor Rs2 and a current detection circuit 3b.

Each component is connected in the following way. A positive electrode side terminal of the power supply section $V_{DC}$ is connected to one end of the capacitor C1, one end of the capacitor C2, a drain of the main MOSFET 11, a cathode of the built-in diode D11, a drain of the sense MOSFET 12, and a cathode of the built-in diode D12.

A gate of the main MOSFET 11 is connected to a gate of the sense MOSFET 12 and an output terminal OUT of the control IC 13. A source of the sense MOSFET 12 is connected to an anode of the built-in diode D12 and an anode of the reverse-current prevention diode D1.

A cathode of the reverse-current prevention diode D1 is connected via an input terminal IN of the control IC 13 to one end of the sense resistor Rs1 and an input end of the current detection circuit 3a. The other end of the sense resistor Rs1 is connected via the node n to a drain of the main MOSFET 21, a cathode of the built-in diode D21, a drain of the sense MOSFET 22, a cathode of the built-in diode D22, and one end of the load L.

A gate of the main MOSFET 21 is connected to a gate of the sense MOSFET 22 and an output terminal OUT of the control IC 23. A source of the sense MOSFET 22 is connected to an anode of the built-in diode D22 and an anode of the reverse-current prevention diode D2.

A cathode of the reverse-current prevention diode D2 is connected via an input terminal IN of the control IC 23 to one end of the sense resistor Rs2 and an input end of the current detection circuit 3b. The negative electrode side terminal of the power supply section $V_{DC}$ is connected to the other end of the capacitor C1, the other end of the capacitor C2, the other end of the sense resistor Rs2, a source of the main MOSFET 21, an anode of the built-in diode D21, and the other end of the load L.

In the upper arm circuit 14, the main switch sw1l and the sense switch sw12 are switching-driven by a drive signal ds1 output from the output terminal OUT of the control IC 13.

Furthermore, the control IC 13 receives at the input terminal IN a sense current Is1 flowing from the sense switch sw12 and converts the sense current Is1 to a voltage signal by the sense resistor Rs1 for sense current detection. In addition, on the basis of the voltage signal, the current detection circuit 3a detects overcurrent which may occur in the main switch sw11.

Furthermore, in the lower arm circuit 24, the main switch sw21 and the sense switch sw22 are switching-driven by a drive signal ds2 output from the output terminal OUT of the control IC 23.

In addition, the control IC 23 receives at the input terminal IN a sense current Is2 flowing from the sense switch sw22 and converts the sense current Is2 to a voltage signal by the sense resistor Rs2 for sense current detection. Moreover, on the basis of the voltage signal, the current detection circuit 3b detects overcurrent which may occur in the main switch sw21.

When the main switch sw11 located in the output circuit 10 of the upper arm circuit 14 changes from an on-state to an off-state in the semiconductor device 1-1 having the above structure, a regenerative current IF is generated in the load L because of the regenerative operation of the load L.

In the output circuit 20 of the lower arm circuit 24, the reverse-current prevention diode D2 is located between the sense MOSFET 22 and the sense resistor Rs2. Accordingly, in this case, a shunt of the regenerative current IF, which is generated at the time of the regenerative operation of the load L, to the sense MOSFET 22 is cut off by the reverse-current prevention diode D2. That is to say, a shunt of the regenerative current IF does not occur. As a result, generation of a reverse voltage caused by a shunt of the regenerative current IF is prevented. This prevents a reverse voltage from being applied to the control IC 23.

Figure 3:
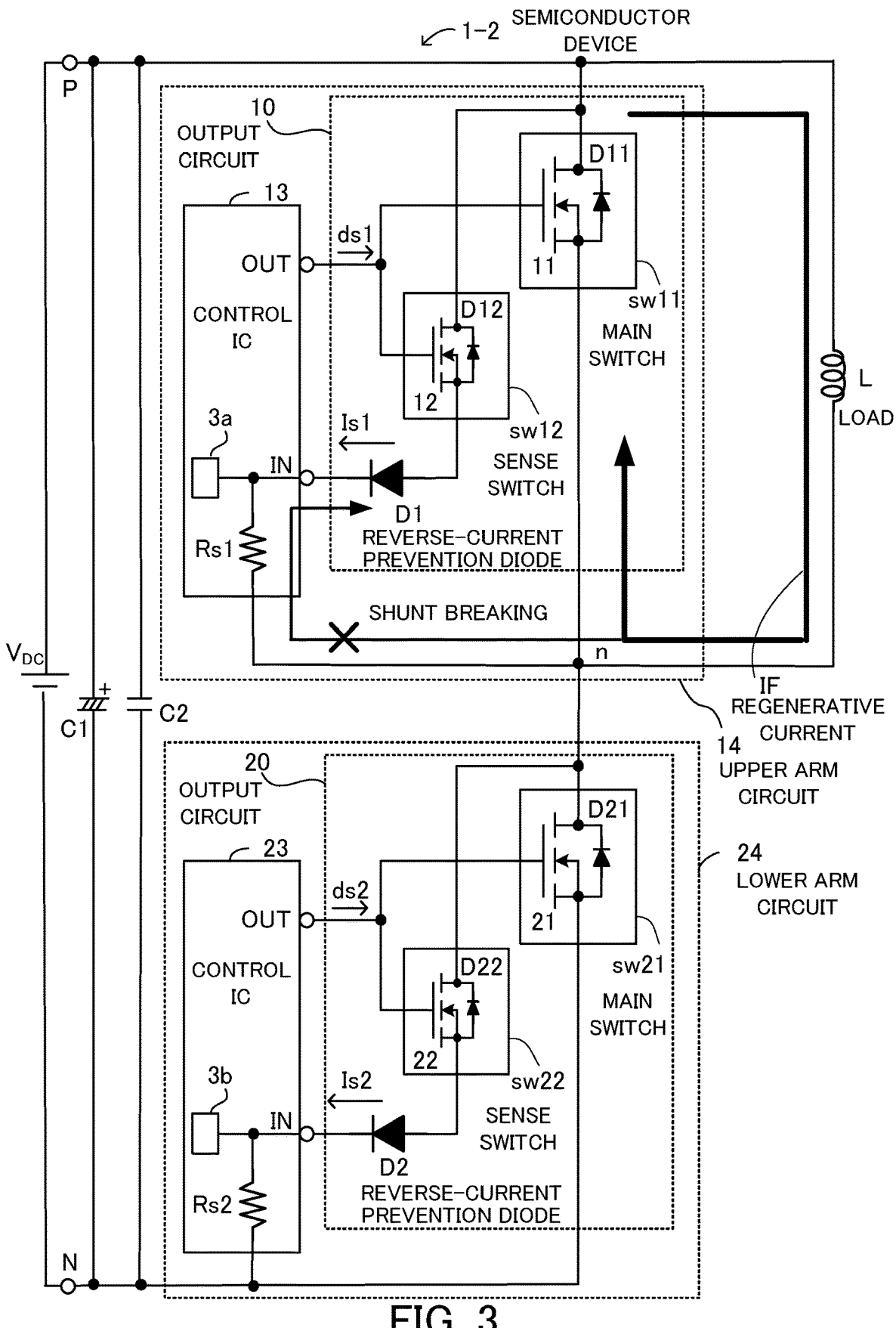
FIG. 3 illustrates an example of the structure of a semiconductor device.

FIG. 3 illustrates an example of the structure of a semiconductor device. A semiconductor device 1-2 includes an upper arm circuit 14, a lower arm circuit 24, a load L, a capacitor C1 (polarized), a capacitor C2, and a power supply section $V_{DC}$. The upper arm circuit 14 and the lower arm circuit 24 are located on the upper arm side and the lower arm side, respectively, and are connected via a node n. A method for connecting each component in FIG. 3 differs from the method for connecting each component in FIG. 2 only in that one end of the load L is connected to a positive electrode side terminal of the power supply section $V_{DC}$ and in that the other end of the load L is connected to the node n.

When a main switch sw21 located in a lower arm side output circuit 20 changes from an on-state to an off-state in the semiconductor device 1-2 having the above structure, a regenerative current IF is generated in the load L because of the regenerative operation of the load L.

In an output circuit 10, a reverse-current prevention diode D1 is located between a sense MOSFET 12 and a sense resistor Rs1. Accordingly, in this case, a shunt of the regenerative current IF, which is generated at the time of the regenerative operation of the load L, to the sense MOSFET 12 is cut off by the reverse-current prevention diode D1. That is to say, a shunt of the regenerative current IF does not occur. As a result, generation of a reverse voltage caused by a shunt of the regenerative current IF is prevented. This prevents a reverse voltage from being applied to a control IC 13.

Figure 4:
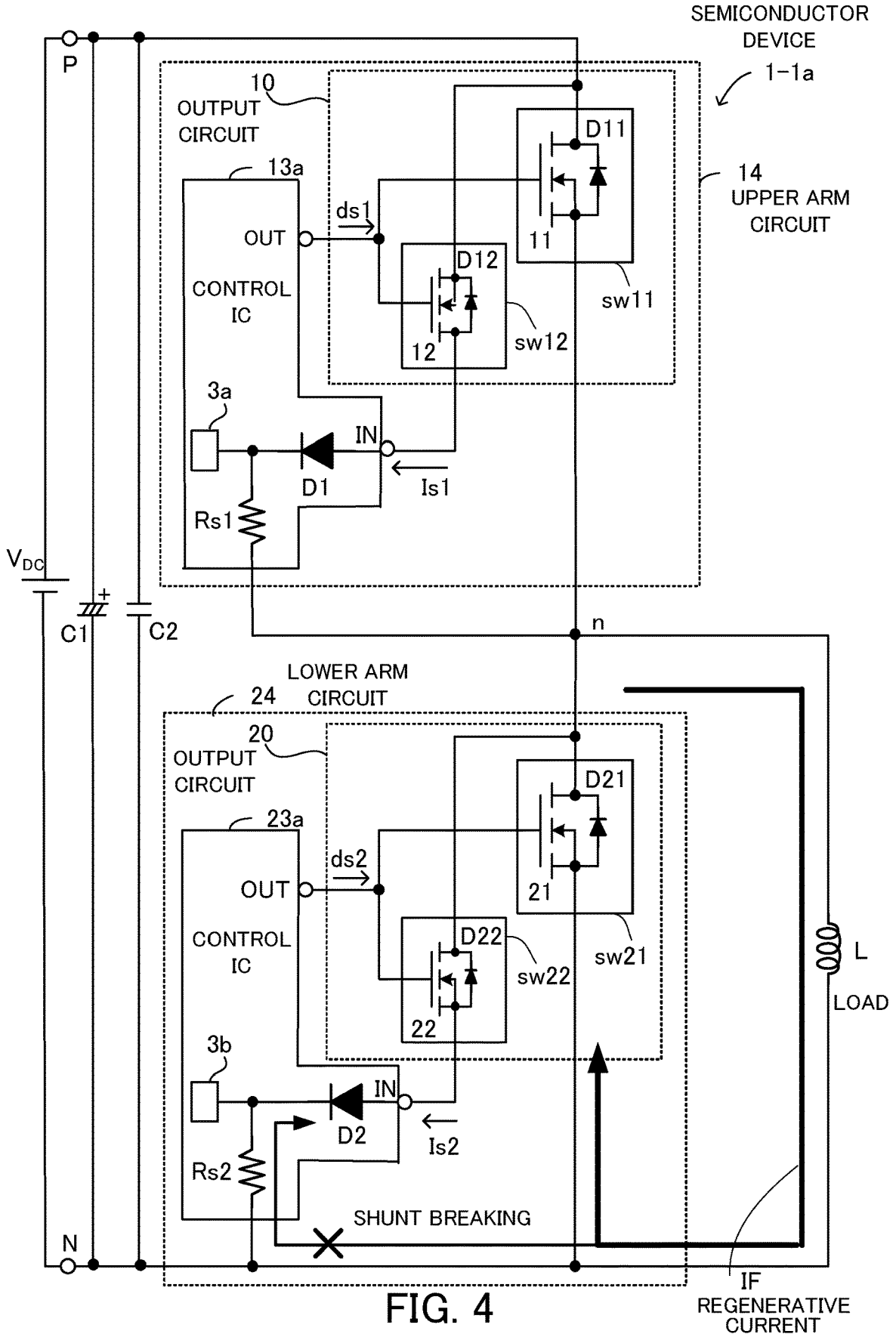
FIG. 4 illustrates an example of the structure of a semiconductor device.
Figure 5:
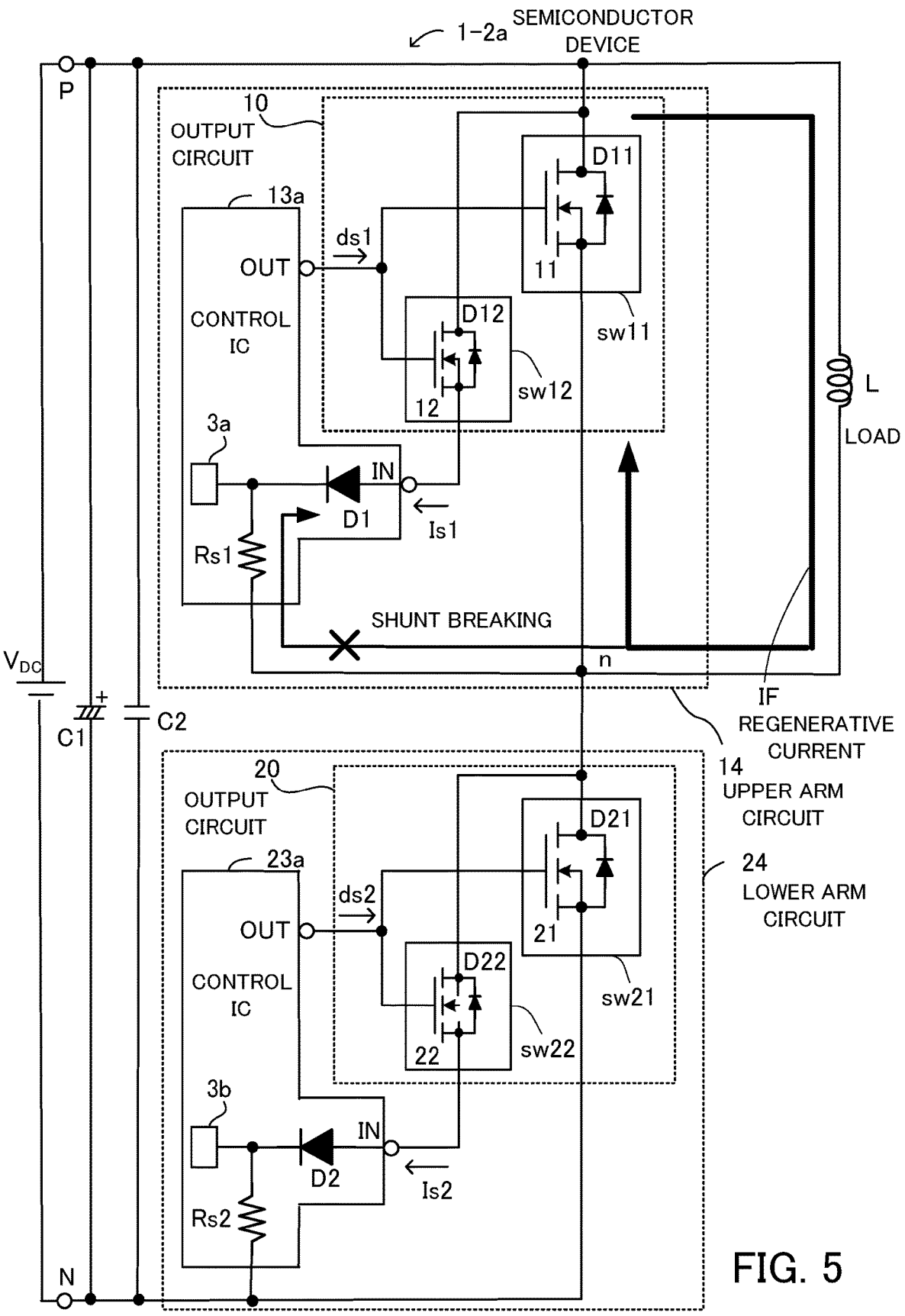
FIG. 5 illustrates an example of the structure of a semiconductor device.

Each of FIGS. 4 and 5 illustrates an example of the structure of a semiconductor device. With the semiconductor devices 1-1 and 1-2 illustrated in FIGS. 2 and 3, respectively, the reverse-current prevention diode D1 is located over a printed-circuit board of the upper arm circuit 14 outside the control IC 13 and the reverse-current prevention diode D2 is located over a printed-circuit board of the lower arm circuit 24 outside the control IC 23.

With semiconductor devices 1-1a and 1-2a illustrated in FIGS. 4 and 5, respectively, on the other hand, a control IC 13a includes a sense resistor Rs1, a current detection circuit 3a, and a reverse-current prevention diode D1 and a control IC 23a includes a sense resistor Rs2, a current detection circuit 3b, and a reverse-current prevention diode D2.

A reverse-current prevention diode may be located in this way in a control IC for integration. By adopting such structure, circuit mounting scale over a printed-circuit board of an upper arm circuit 14 and a printed-circuit board of a lower arm circuit 24 is reduced.

Figure 6:
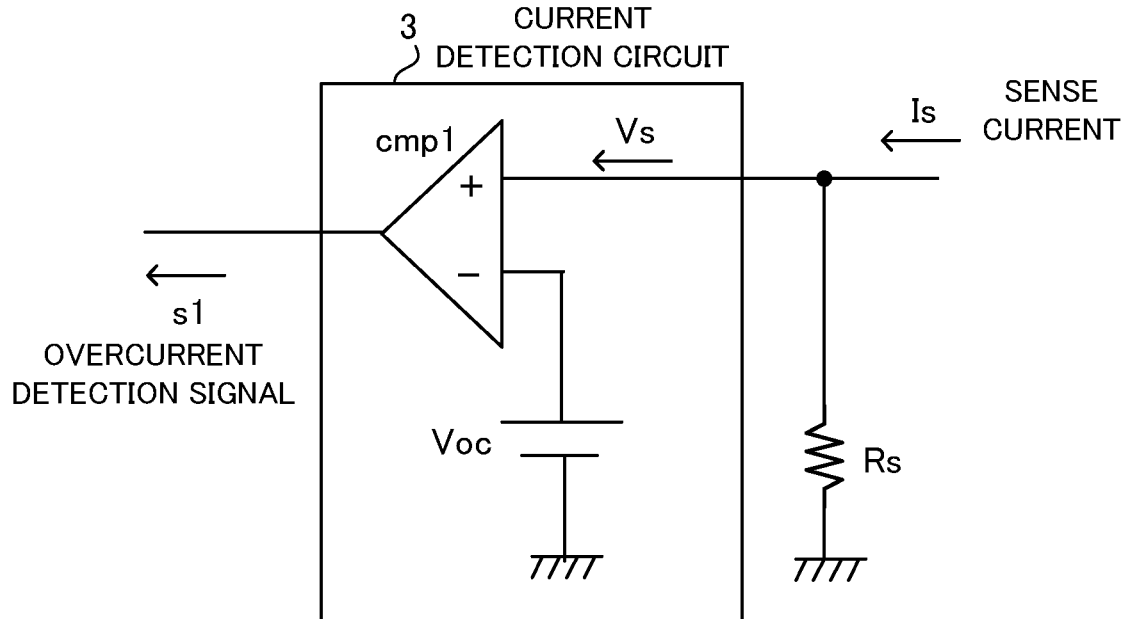
FIG. 6 illustrates an example of the structure of a current detection circuit.

FIG. 6 illustrates an example of the structure of a current detection circuit. A "current detection circuit 3" is a general term for the current detection circuits 3a and 3b included in the control ICs 13 and 23, respectively, and a "sense resistor Rs" is a general term for the sense resistors Rs1 and Rs2 included in the control ICs 13 and 23, respectively.

The current detection circuit 3 includes a comparator cmp1. One end of the sense resistor Rs is connected to a non-inverting input terminal (+) of the comparator cmp1 and a threshold voltage Voc is applied to an inverting input terminal (−) of the comparator cmp1. The other end of the sense resistor Rs is connected to GND.

When a main MOSFET is turned on, on the basis of a drive signal, a sense MOSFET is also turned on and a sense current Is is output from a source of the sense MOSFET. Furthermore, the sense current Is output from the sense MOSFET flows through a sense resistor Rs. As a result, a drop in voltage occurs and a voltage signal Vs (=Rs×Is) generated at this time is input to a current detection circuit 3.

The comparator cmp1 of the current detection circuit 3 compares the voltage signal Vs and a threshold voltage Voc to detect whether or not the main MOSFET is in an overcurrent state. When the voltage signal Vs is higher than or equal to the threshold voltage Voc (Voc≤Vs), the comparator cmp1 outputs an H-level overcurrent detection signal s1. When a control IC 13 recognizes the overcurrent detection signal s1, the control IC 13 stops driving the main MOSFET.

Figure 7:
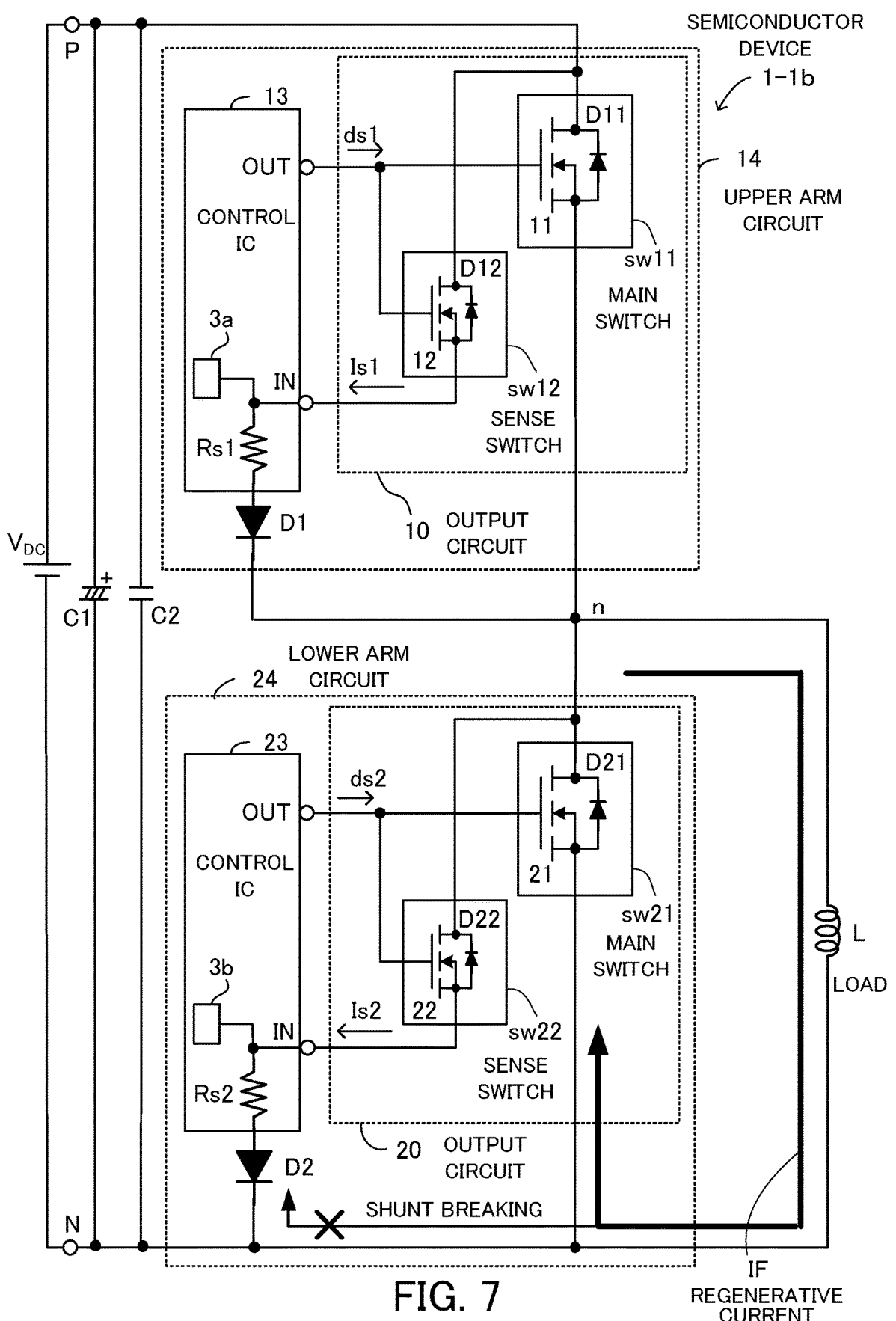
FIG. 7 illustrates an example of the structure of a semiconductor device.

FIG. 7 illustrates an example of the structure of a semiconductor device. A semiconductor device 1-1b includes an upper arm circuit 14, a lower arm circuit 24, a load L, a capacitor C1 (polarized), a capacitor C2, and a power supply section $V_{DC}$. The upper arm circuit 14 and the lower arm circuit 24 are located on the upper arm side and the lower arm side, respectively, and are connected via a node n. One end of the load L is connected to the node n and the other end of the load L is connected to a negative electrode side terminal of the power supply section $V_{DC}$.

Furthermore, a reverse-current prevention diode D1 is located between a sense resistor Rs1 and a current output terminal of a main switch sw11 and a reverse-current prevention diode D2 is located between a sense resistor Rs2 and a current output terminal of a main switch sw21.

That is to say, an anode of the reverse-current prevention diode D1 is connected to the other end of the sense resistor Rs1. A cathode of the reverse-current prevention diode D1 is connected to a source of a main MOSFET 11 and an anode of a built-in diode D11 and is connected via the node n to the one end of the load L.

On the other hand, an anode of the reverse-current prevention diode D2 is connected to the other end of the sense resistor Rs2. A cathode of the reverse-current prevention diode D2 is connected to a source of a main MOSFET 21, an anode of a built-in diode D21, and the other end of the load L. A method for connecting each component in FIG. 7 differs from the method for connecting each component in FIG. 2 only in these respects.

When the main switch sw11 located in an output circuit 10 of the upper arm circuit 14 changes from an on-state to an off-state in the semiconductor device 1-1b having the above structure, a regenerative current IF is generated in the load L because of the regenerative operation of the load L.

The reverse-current prevention diode D2 is located between the sense resistor Rs2 and the current output terminal of the main switch sw21 in an output circuit 20 of the lower arm circuit 24. Accordingly, in this case, a shunt of the regenerative current IF, which is generated at the time of the regenerative operation of the load L, to the sense switch sw22 is cut off by the reverse-current prevention diode D2. That is to say, a shunt of the regenerative current IF does not occur. As a result, application of a reverse voltage caused by a shunt of the regenerative current IF to the control IC 23 is prevented.

Figure 8:
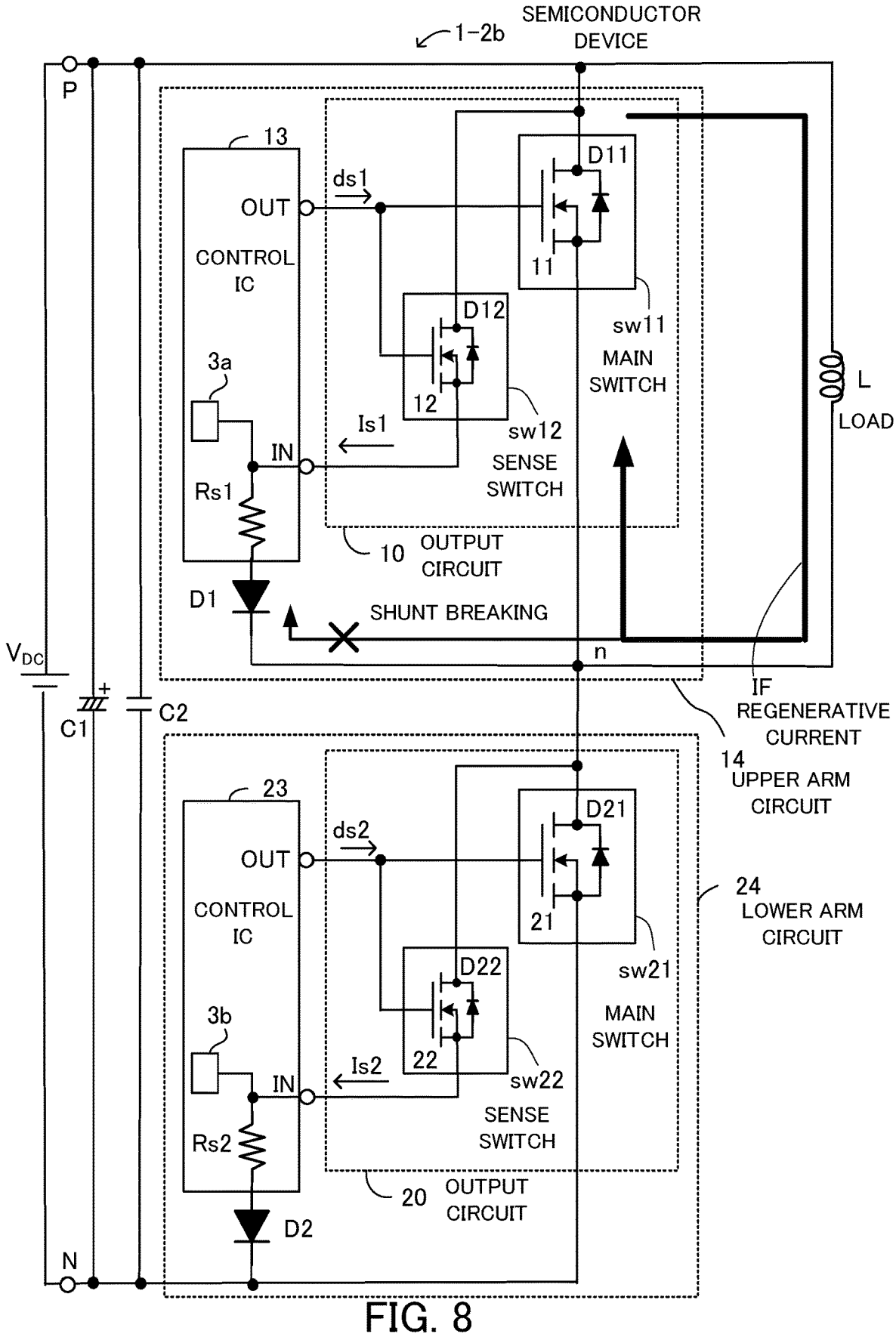
FIG. 8 illustrates an example of the structure of a semiconductor device.

FIG. 8 illustrates an example of the structure of a semiconductor device. A semiconductor device 1-2b includes an upper arm circuit 14, a lower arm circuit 24, a load L, a capacitor C1 (polarized), a capacitor C2, and a power supply section $V_{DC}$. The upper arm circuit 14 and the lower arm circuit 24 are located on the upper arm side and the lower arm side, respectively, and are connected via a node n. One end of the load L is connected to a positive electrode side terminal of the power supply section $V_{DC}$ and the other end of the load L is connected to the node n. A method for connecting each component in FIG. 8 differs from the method for connecting each component in FIG. 7 only in this respect.

When a main switch sw21 located in an output circuit 20 of the lower arm circuit 24 changes from an on-state to an off-state in the semiconductor device 1-2b having the above structure, a regenerative current IF is generated in the load L because of the regenerative operation of the load L.

A reverse-current prevention diode D1 is located between a sense resistor Rs1 and a current output terminal of a main switch sw11 in an output circuit 10 of the upper arm circuit 14. Accordingly, in this case, a shunt of the regenerative current IF, which is generated at the time of the regenerative operation of the load L, to a sense switch sw12 is cut off by the reverse-current prevention diode D1. That is to say, a shunt of the regenerative current IF does not occur. As a result, application of a reverse voltage caused by a shunt of the regenerative current IF to the control IC 13 is prevented.

Figure 9:
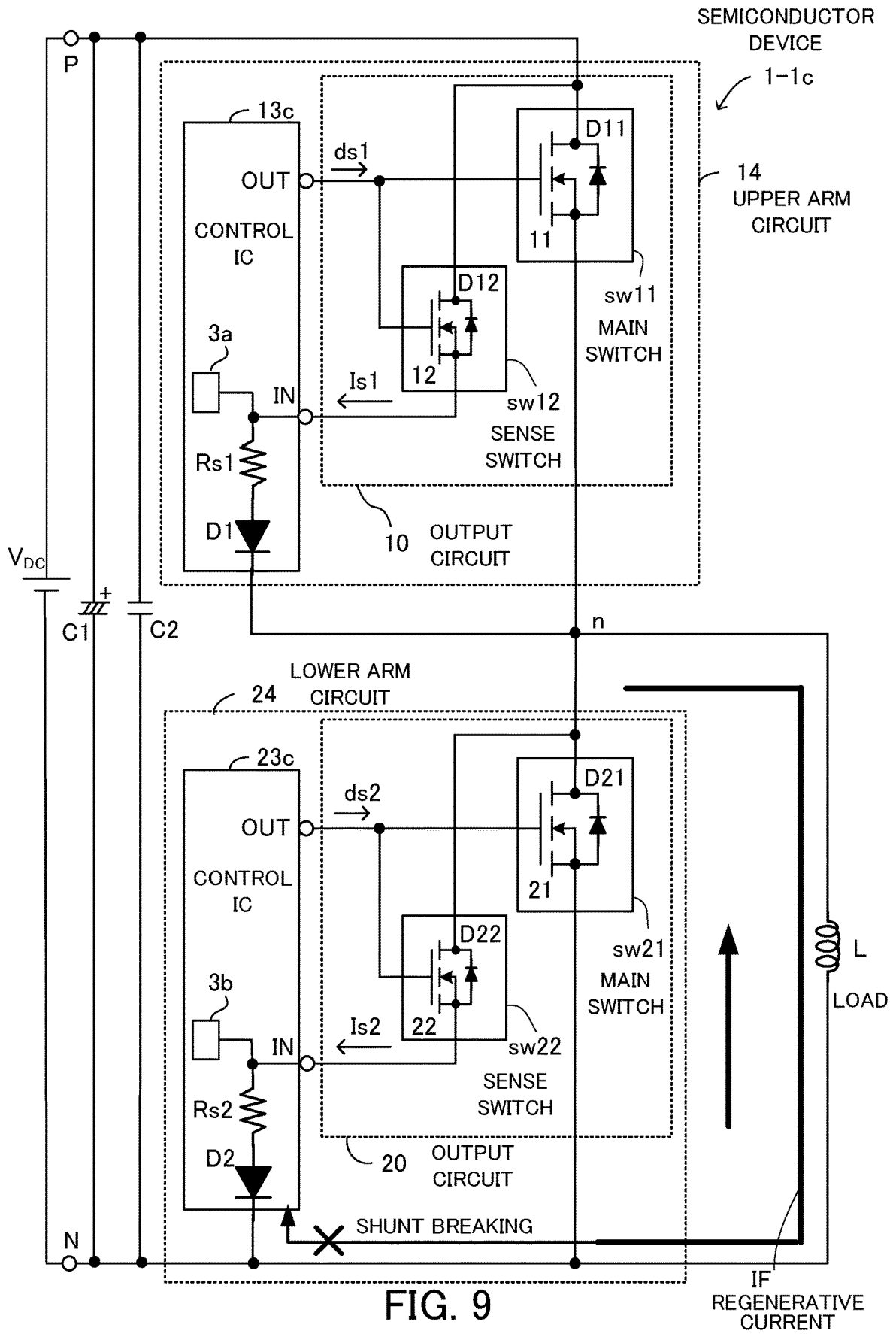
FIG. 9 illustrates an example of the structure of a semiconductor device.
Figure 10:
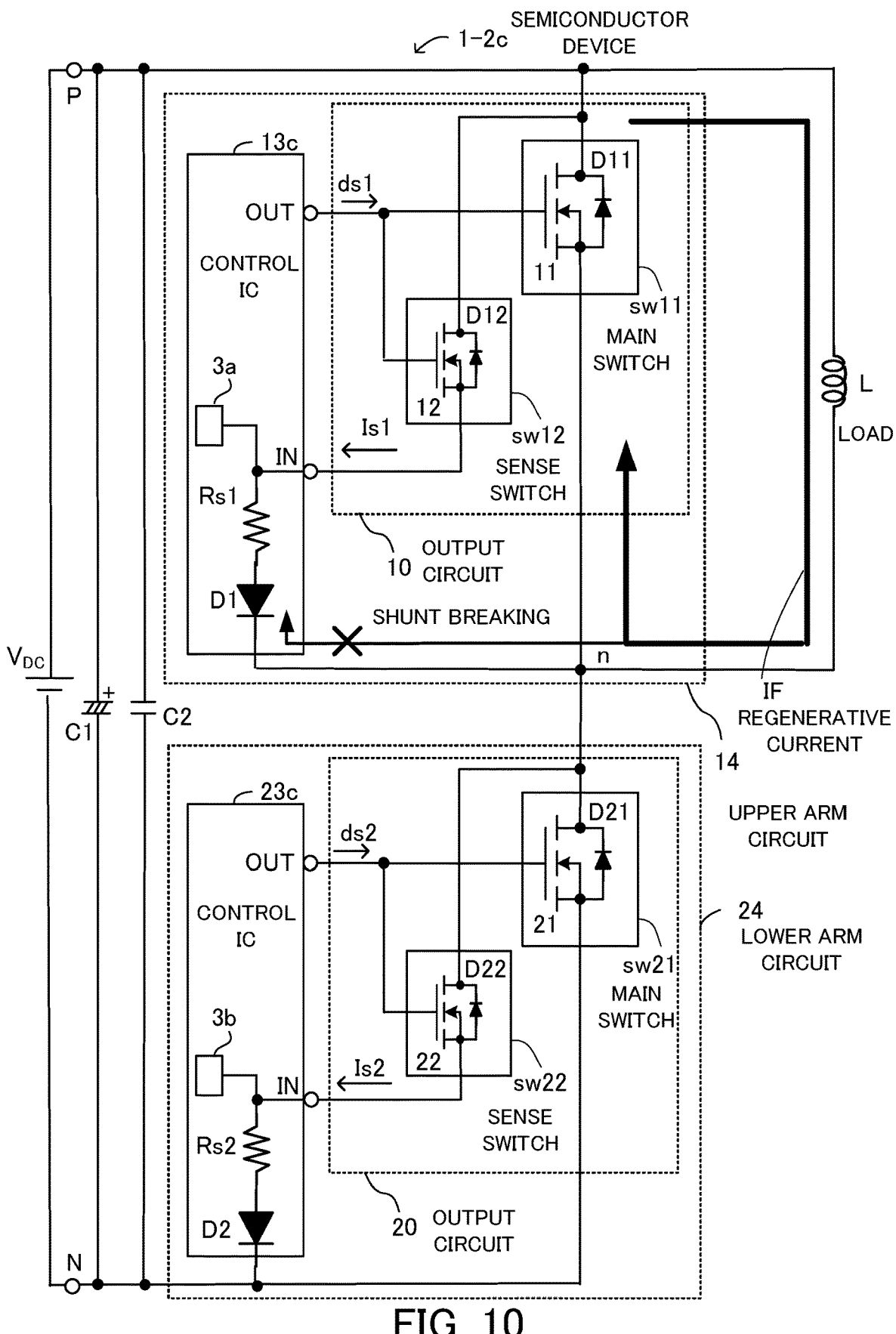
FIG. 10 illustrates an example of the structure of a semiconductor device.

Each of FIGS. 9 and 10 illustrates an example of the structure of a semiconductor device. With the semiconductor devices 1-1b and 1-2b illustrated in FIGS. 7 and 8, respectively, the reverse-current prevention diode D1 is located over a printed-circuit board of the upper arm circuit 14 outside the control IC 13 and the reverse-current prevention diode D2 is located over a printed-circuit board of the lower arm circuit 24 outside the control IC 23.

With semiconductor devices 1-1c and 1-2c illustrated in FIGS. 9 and 10, respectively, on the other hand, a control IC 13c includes a sense resistor Rs1, a current detection circuit 3a, and a reverse-current prevention diode D1 and a control IC 23c includes a sense resistor Rs2, a current detection circuit 3b, and a reverse-current prevention diode D2.

A reverse-current prevention diode may be located in this way in a control IC for integration. By adopting such structure, circuit mounting scales over a printed-circuit board of an upper arm circuit 14 and a printed-circuit board of a lower arm circuit 24 are reduced.

Figure 11:
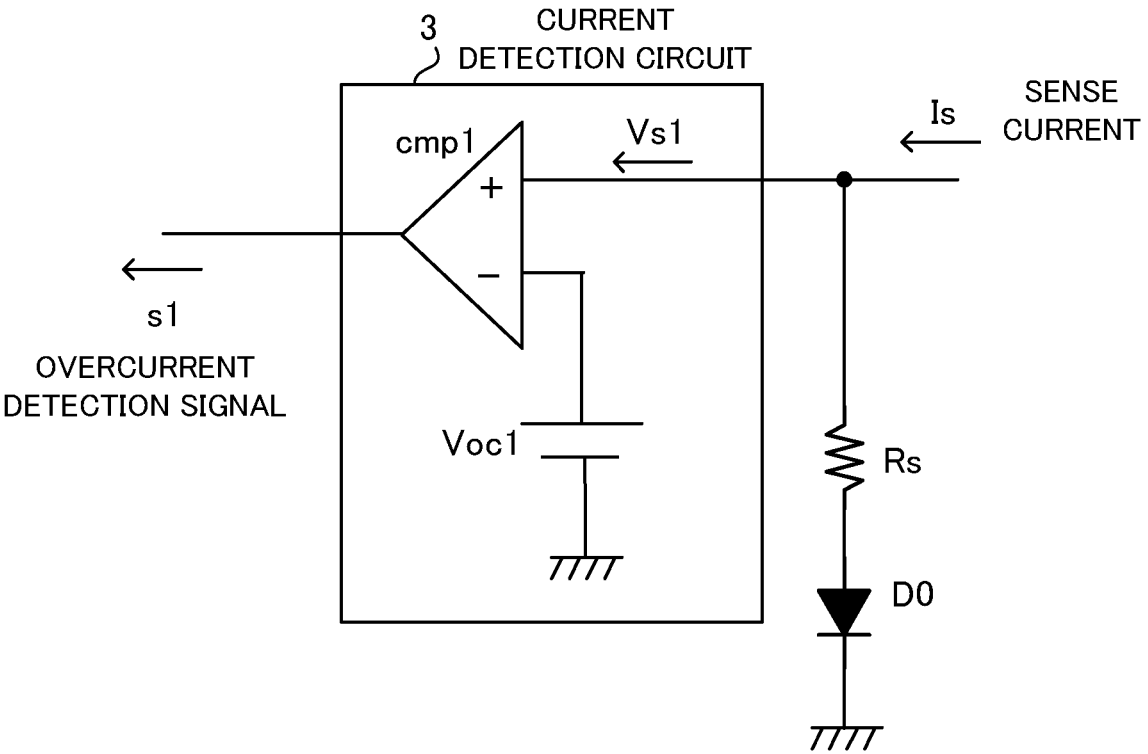
FIG. 11 illustrates an example of the structure of a current detection circuit.

FIG. 11 illustrates an example of the structure of a current detection circuit. A current detection circuit 3 includes a comparator cmp1. One end of a sense resistor Rs is connected to a non-inverting input terminal (+) of the comparator cmp1 and a threshold voltage Voc1 is applied to an inverting input terminal (−) of the comparator cmp1. An anode of a reverse-current prevention diode D0 is connected to the other end of the sense resistor Rs and a cathode of the reverse-current prevention diode D0 is connected to GND.

When a main MOSFET is turned on, on the basis of a drive signal, a sense MOSFET is also turned on and a sense current Is is output from a sense source of the sense MOSFET. Furthermore, the sense current Is output from the sense MOSFET flows through a sense resistor Rs and the reverse-current prevention diode D0.

When the sense current Is flows through the sense resistor Rs, a voltage drop (Rs×Is) occurs. When the sense current Is flows through the reverse-current prevention diode D0, a forward voltage drop (Vf) occurs. That is to say, a voltage drop corresponding to the total of these voltage drops occurs. As a result, a voltage signal Vs1 (=Rs×Is+Vf) is input to the comparator cmp1.

The comparator cmp1 of the current detection circuit 3 compares the voltage signal Vs1 and a threshold voltage Voc1 to detect whether or not the main MOSFET is in an overcurrent state. When the voltage signal Vs1 is higher than or equal to the threshold voltage Voc1 (Voc1≤Vs1), the comparator cmp1 outputs an H-level overcurrent detection signal s1. When a control IC recognizes the overcurrent detection signal s1, the control IC stops driving the main MOSFET.

Figure 12:
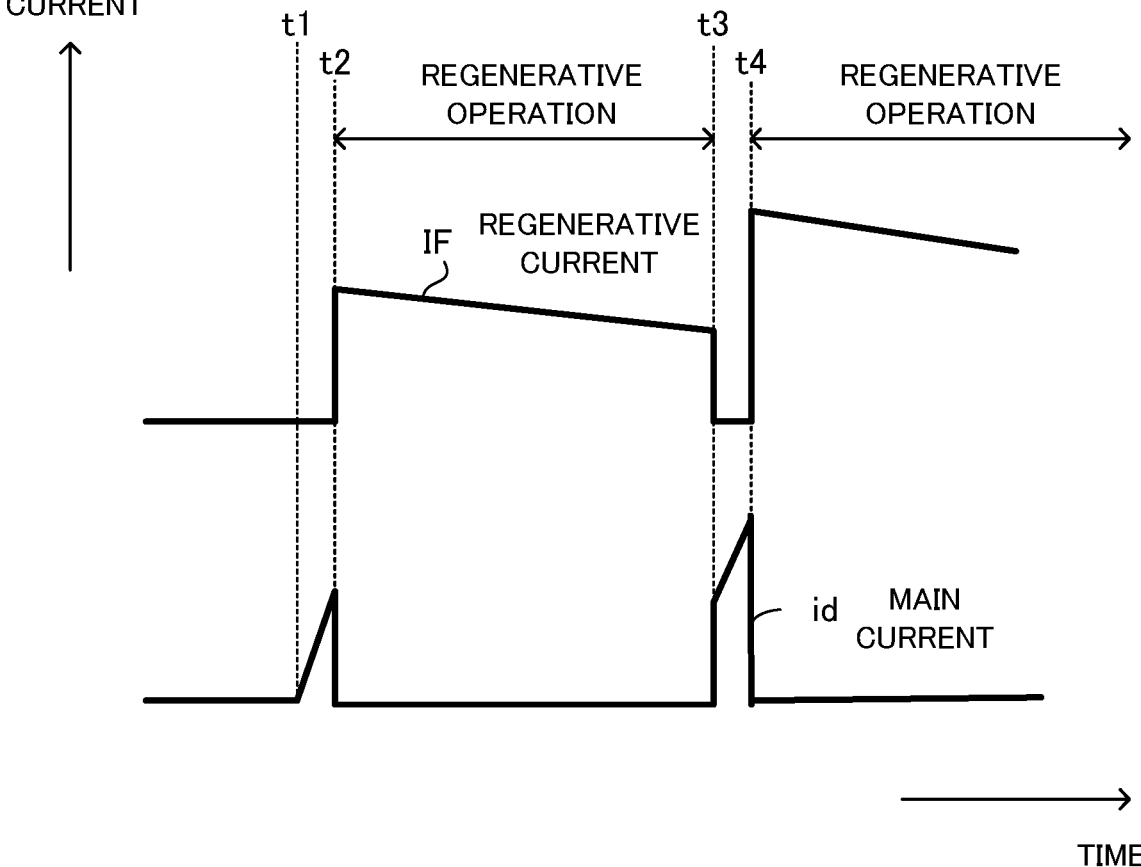
FIG. 12 illustrates the relationship between a main current and a regenerative current.

Simulation results will now be described with reference to FIGS. 12 through 14. FIG. 12 illustrates the relationship between a main current and a regenerative current. In FIG. 12, a vertical axis indicates current and a horizontal axis indicates time.

(time t1) An upper arm main MOSFET 11 is turned on. At this time, a main current (drain current) id of the main MOSFET 11 begins to flow and the main current id increases.

(time t2) The upper arm main MOSFET 11 is turned off. At this time, the main current id of the main MOSFET 11 drops and the flow of the main current id decreases. Furthermore, because the main MOSFET 11 changes from an on-state to an off-state, a load L performs regenerative operation, a regenerative current IF begins to flow, and the regenerative current IF increases.

(time t2 to time t3) For a time period from the time t2 at which the main MOSFET 11 is turned off to the time t3 at which the main MOSFET 11 is turned on, the load L performs the regenerative operation and the regenerative current IF flows.

(time t3) The upper arm main MOSFET 11 is turned on. At this time, the main current id of the main MOSFET 11 begins to flow and the main current id increases. Furthermore, the flow of the regenerative current IF decreases.

(time t4) The upper arm main MOSFET 11 is turned off. At this time, the main current id of the main MOSFET 11 drops and the flow of the main current id decreases. Furthermore, because the main MOSFET 11 changes from an on-state to an off-state, the load L performs regenerative operation, the regenerative current IF begins to flow, and the regenerative current IF increases. The amount of the regenerative current IF increases in proportion to the amount of the main current id.

Figure 13:
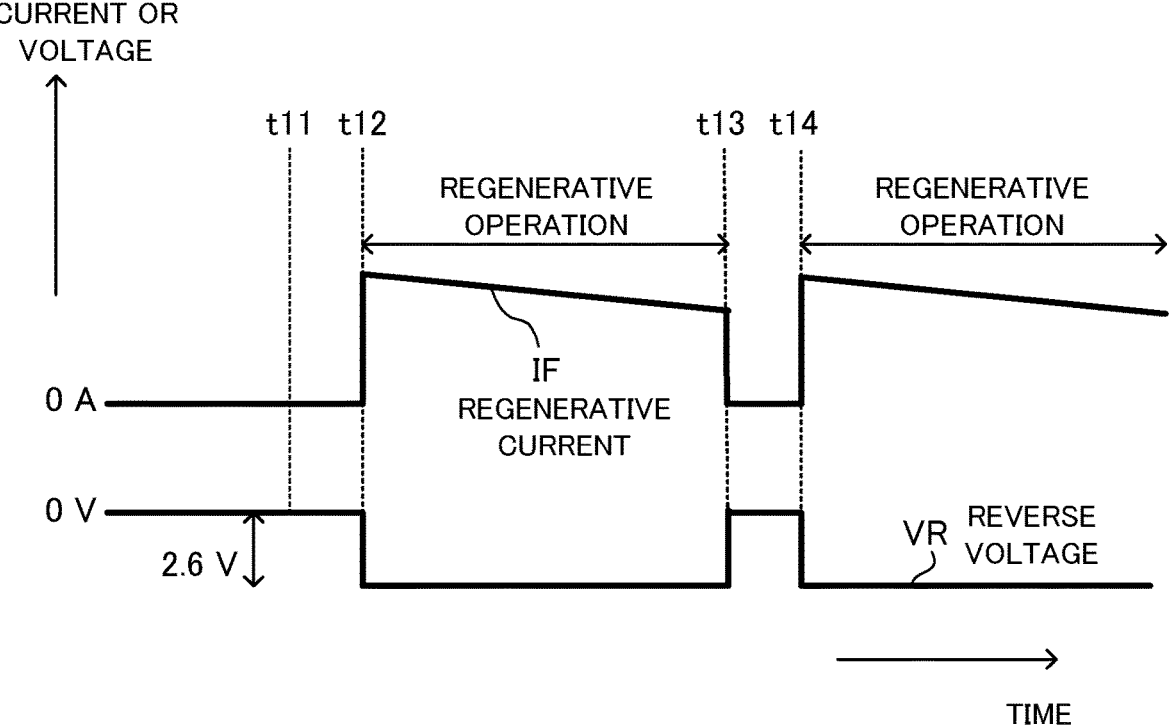
FIG. 13 illustrates the relationship between a regenerative current and a reverse voltage obtained when a reverse-current prevention diode is not located.

FIG. 13 illustrates the relationship between a regenerative current and a reverse voltage obtained when a reverse-current prevention diode is not located. In FIG. 13, a vertical axis indicates current or voltage and a horizontal axis indicates time.

(time t11) An upper arm main MOSFET 11 is turned on.

(time t12) The upper arm main MOSFET 11 is turned off. Because the main MOSFET 11 changes from an on-state to an off-state, a load L performs regenerative operation, a regenerative current IF begins to flow, and the regenerative current IF increases. Furthermore, because part of the regenerative current IF flows to a control IC, a reverse voltage VR is generated in the control IC. In the example of FIG. 13, the reverse voltage VR of about 2.6 volts is generated in the control IC.

(time t12 to time t13) For a time period from the time t12 at which the main MOSFET 11 is turned off to the time t13 at which the main MOSFET 11 is turned on, the regenerative current IF flows. Accordingly, the reverse voltage VR is generated in the control IC for this time period.

(time t13) The upper arm main MOSFET 11 is turned on. The regenerative operation is stopped and the flow of the regenerative current IF decreases. Accordingly, the generation of the reverse voltage VR is also stopped.

(time t14) The upper arm main MOSFET 11 is turned off. Because the main MOSFET 11 changes from an on-state to an off-state, the load L performs regenerative operation, the regenerative current IF begins to flow, and the regenerative current IF increases. Furthermore, because part of the regenerative current IF flows to the control IC, the reverse voltage VR is generated again in the control IC.

Figure 14:
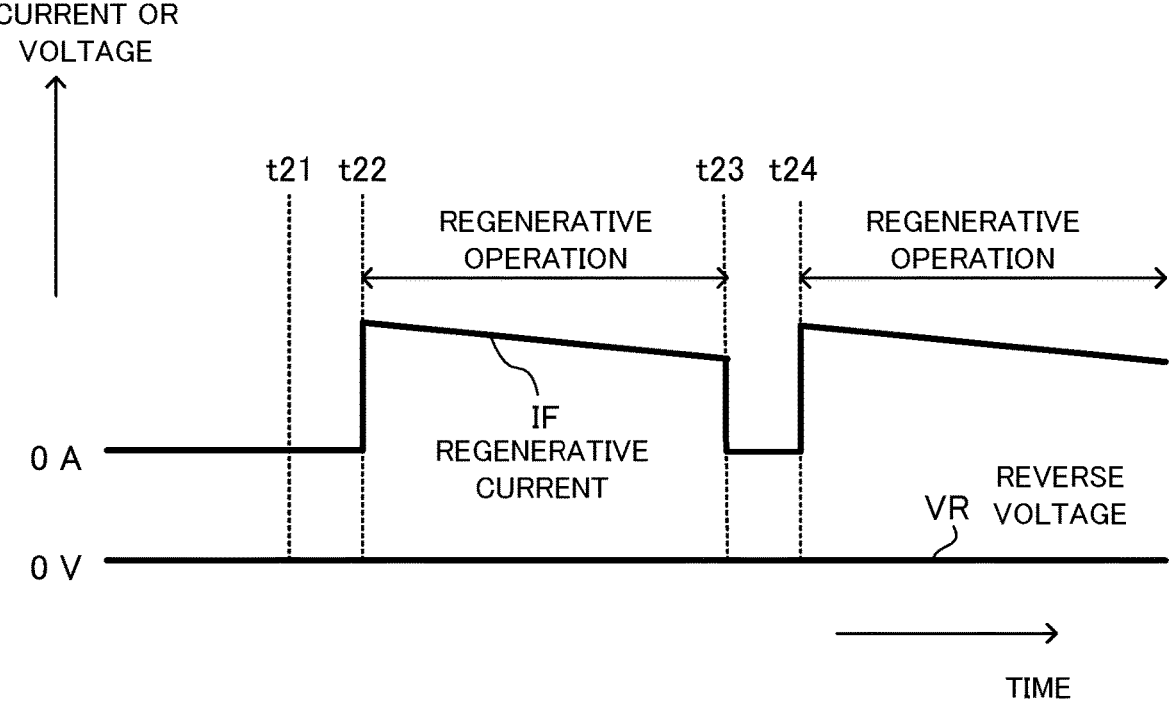
FIG. 14 illustrates the relationship between a regenerative current and a reverse voltage obtained when a reverse-current prevention diode is located.

FIG. 14 illustrates the relationship between a regenerative current and a reverse voltage obtained when a reverse-current prevention diode is located. In FIG. 14, a vertical axis indicates current or voltage and a horizontal axis indicates time.

(time t21) An upper arm main MOSFET 11 is turned on.

(time t22) The upper arm main MOSFET 11 is turned off. Because the main MOSFET 11 changes from an on-state to an off-state, a load L performs regenerative operation, a regenerative current IF begins to flow, and the regenerative current IF increases. Furthermore, because a reverse-current prevention diode is located, a shunt of the regenerative current IF to a control IC is cut off and a reverse voltage VR is not generated in the control IC.

(time t22 to time t23) For a time period from the time t22 at which the main MOSFET 11 is turned off to the time t23 at which the main MOSFET 11 is turned on, the regenerative current IF flows. However, because the reverse-current prevention diode is located, a shunt of the regenerative current IF to the control IC is cut off and the reverse voltage VR is not generated in the control IC.

(time t23) The upper arm main MOSFET 11 is turned on. The regenerative operation is stopped and the flow of the regenerative current IF decreases.

(time t24) The upper arm main MOSFET 11 is turned off. Because the main MOSFET 11 changes from an on-state to an off-state, the load L performs regenerative operation, the regenerative current IF begins to flow, and the regenerative current IF increases. However, because the reverse-current prevention diode is located, a shunt of the regenerative current IF to the control IC is cut off and the reverse voltage VR is not generated in the control IC. By adopting the structure according to the present disclosure, the generation of the reverse voltage VR is prevented in this way.

Figure 15:
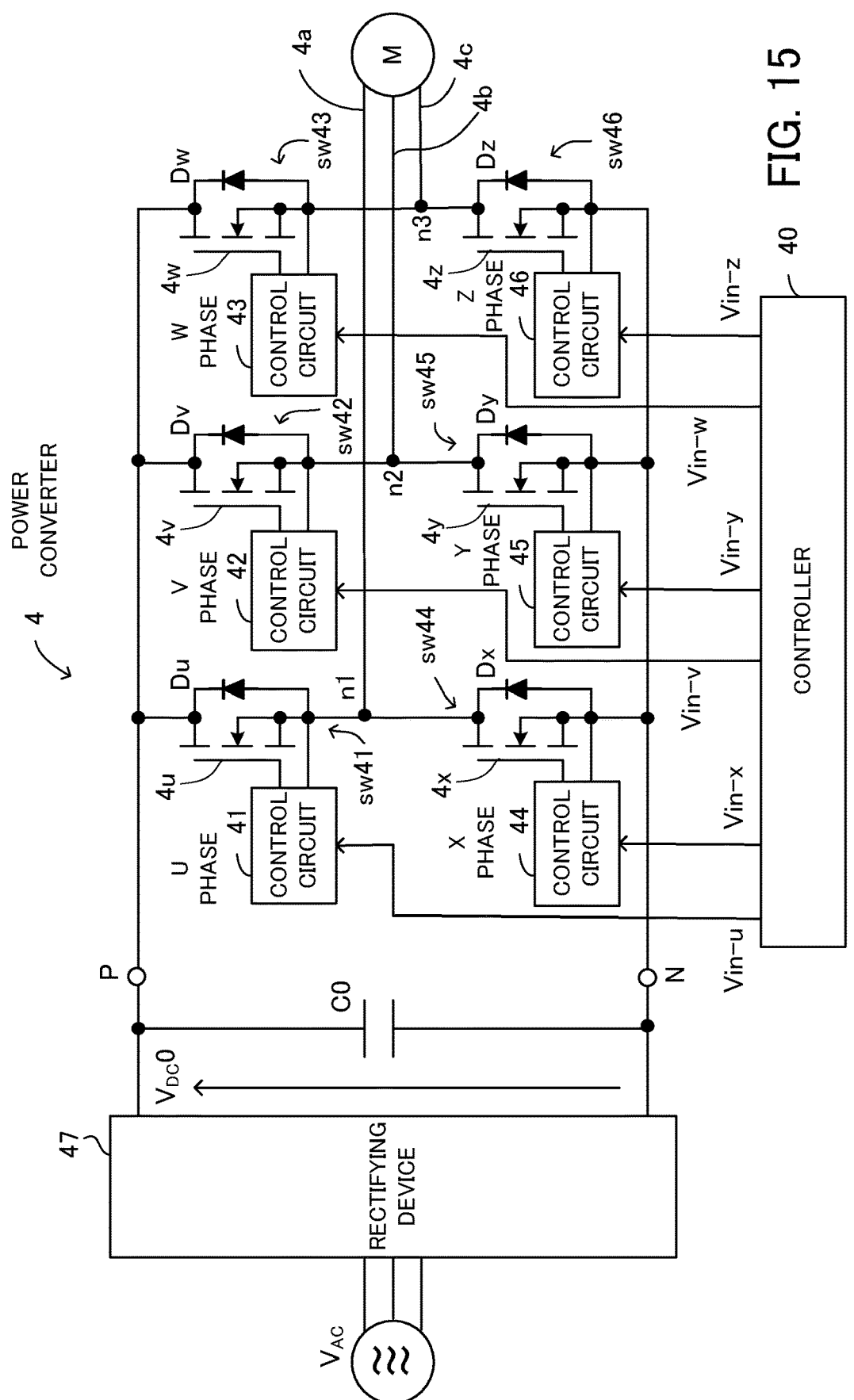
FIG. 15 illustrates an example of the structure of a power converter.
Figure 16:
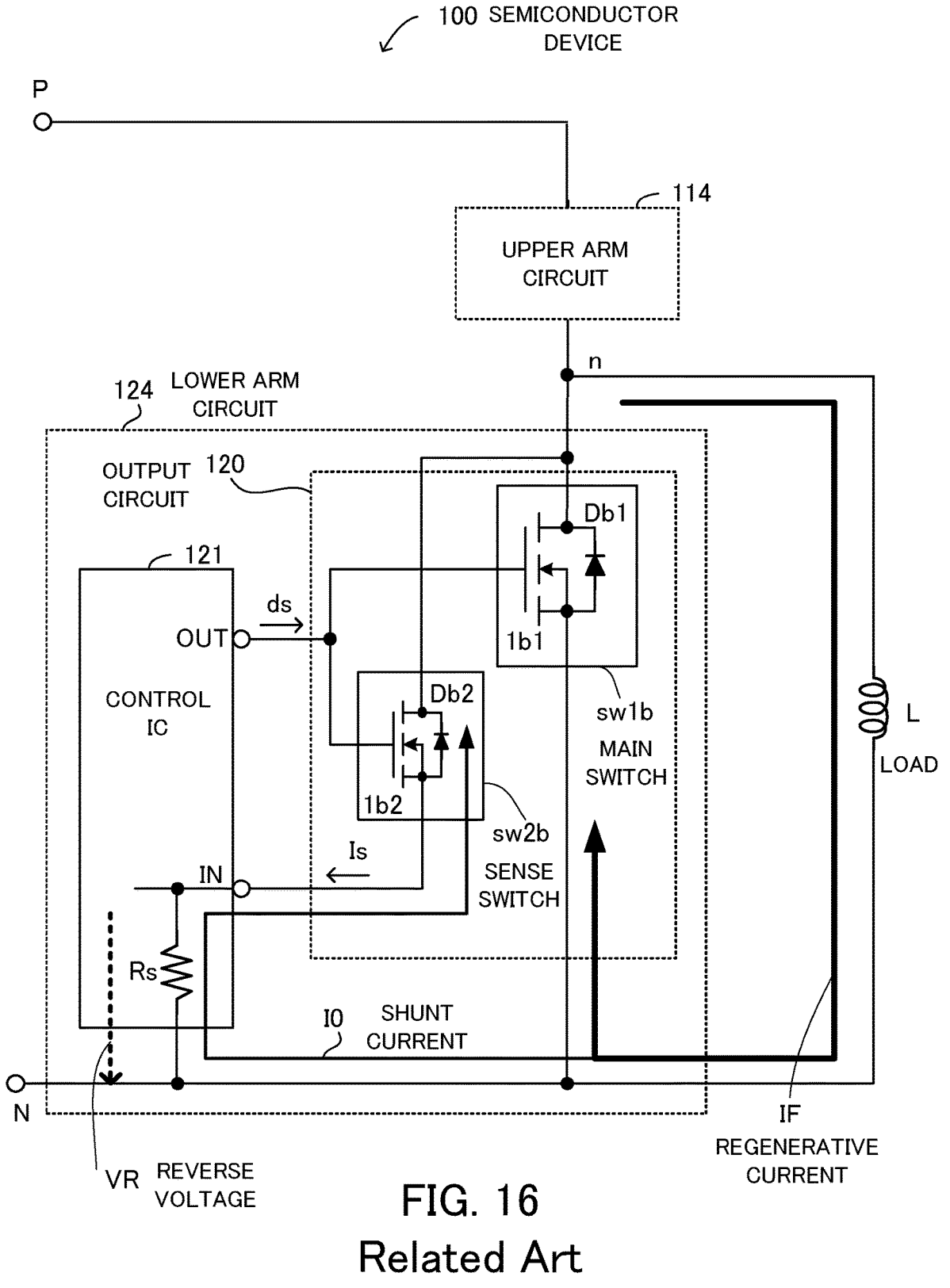
FIG. 16 is a view for describing the generation of a reverse voltage caused by a shunt of a regenerative current.

A power converter to which the semiconductor device according to the present disclosure is applied will now be described. FIG. 15 illustrates an example of the structure of a power converter. A power converter 4 includes switching elements sw41, sw42, and sw43 for a U phase, a V phase, and a W phase, respectively, located on an upper arm side and switching elements sw44, sw45, and sw46 for an X phase, a Y phase, and a Z phase, respectively, located on a lower arm side.

Furthermore, the power converter 4 includes an alternating-current power supply V$_{AC}$, a rectifying device 47, a smoothing capacitor C0, a controller 40, and a load M. The rectifying device 47 converts an alternating-current voltage output from the alternating-current power supply V$_{AC}$ to a direct-current voltage V$_{DC}$0.

On the other hand, power is supplied to the load M from a wiring 4a connected to a node n1, which is a connection point of the switching element sw41 and the switching element sw44, a wiring 4b connected to a node n2, which is a connection point of the switching element sw42 and the switching element sw45, and a wiring 4c connected to a node n3, which is a connection point of the switching element sw43 and the switching element sw46.

The U-phase switching element sw41 includes a main MOSFET 4u and a built-in diode Du. The V-phase switching element sw42 includes a main MOSFET 4v and a built-in diode Dv. The W-phase switching element sw43 includes a main MOSFET 4w and a built-in diode Dw.

The X-phase switching element sw44 includes a main MOSFET 4x and a built-in diode Dx. The Y-phase switching element sw45 includes a main MOSFET 4y and a built-in diode Dy. The Z-phase switching element sw46 includes a main MOSFET 4z and a built-in diode Dz.

Furthermore, control circuits 41, 42, and 43 which exercise drive control or the like of the switching elements sw41, sw42, and sw43, respectively, are located. Control circuits 44, 45, and 46 which exercise drive control or the like of the switching elements sw44, sw45, and sw46, respectively, are located. In addition, the controller 40 which exercises batch control of the control circuits 41 through 46 is located. For example, each of the control circuits 41, 42, and 43 has the structure (except the main switch sw11) and function of the upper arm circuit 14. For example, each of the control circuits 44, 45, and 46 has the structure (except the main switch sw21) and function of the lower arm circuit 24.

Each component is connected in the following way. A positive electrode side terminal of the rectifying device 47 is connected to one end of the smoothing capacitor C0, a drain of the main MOSFET 4u, a cathode of the built-in diode Du, a drain of the main MOSFET 4v, a cathode of the built-in diode Dv, a drain of the main MOSFET 4w, and a cathode of the built-in diode Dw.

A negative electrode side terminal of the rectifying device 47 is connected to the other end of the smoothing capacitor C0, a source of the main MOSFET 4x, an anode of the built-in diode Dx, a source of the main MOSFET 4y, an anode of the built-in diode Dy, a source of the main MOSFET 4z, and an anode of the built-in diode Dz.

A gate of the main MOSFET 4u is connected to the control circuit 41. An anode of the built-in diode Du is connected to a source of the main MOSFET 4u, the control circuit 41, and the node n1. The node n1 is connected to the load M, a drain of the main MOSFET 4x, and a cathode of the built-in diode Dx.

A gate of the main MOSFET 4v is connected to the control circuit 42. An anode of the built-in diode Dv is connected to a source of the main MOSFET 4v, the control circuit 42, and the node n2. The node n2 is connected to the load M, a drain of the main MOSFET 4y, and a cathode of the built-in diode Dy.

A gate of the main MOSFET 4w is connected to the control circuit 43. An anode of the built-in diode Dw is connected to a source of the main MOSFET 4w, the control circuit 43, and the node n3. The node n3 is connected to the load M, a drain of the main MOSFET 4z, and a cathode of the built-in diode Dz.

The controller 40 controls the control circuit 41 by a control signal Vin-u, controls the control circuit 42 by a control signal Vin-v, and controls the control circuit 43 by a control signal Vin-w. Similarly, the controller 40 controls the control circuit 44 by a control signal Vin-x, controls the control circuit 45 by a control signal Vin-y, and controls the control circuit 46 by a control signal Vin-z.

As described above, a semiconductor device according to the present disclosure includes a shunt breaking circuit. As a result, a shunt of a regenerative current, which is generated at the time of the regenerative operation of a load, to a control IC is suppressed. This suppresses generation of heat by the control IC caused by a shunt current and prevents a failure of the control IC caused by generation of a reverse voltage.

The embodiments have been taken as an example. The structure of each section indicated in each embodiment may be replaced by another structure having the same function. Furthermore, any other component or process may be added. Moreover, the structures (features) of any two or more of the above embodiments may be combined.

According to an aspect, a shunt of a regenerative current is suppressed and generation of a reverse voltage is prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor device, comprising:
a lower arm circuit including a lower arm side output circuit including:
    a lower arm side switching element that is switching-controlled by a lower arm side control circuit and that supplies a power to a load;
    a lower arm side current monitoring element that is switching-controlled by the lower arm side control circuit and that monitors a current flowing through the lower arm side switching element; and
    a lower arm side shunt breaking circuit that is a circuit element that, without application of a control signal, always blocks current in one direction and allows current to pass in the opposite direction, the lower side shunt breaking circuit being electrically connected to a low potential side terminal of the lower arm side current monitoring element; and
an upper arm side switching element connected in series with the lower arm side switching element, wherein
the lower arm side shunt breaking circuit cuts off a shunt of a regenerative current flowing from the load to the lower arm side current monitoring element upon the upper arm side switching element changing from an on-state to an off-state, the load being connected to a connection point of the upper arm side switching element and the lower arm side switching element at one side thereof, and connected to a low potential side terminal of the lower arm side switching element at another side thereof.

2. The semiconductor device according to claim 1, wherein the lower arm circuit further includes a sense resistor that converts a sense current output from the lower arm side current monitoring element to a voltage signal.

3. The semiconductor device according to claim 2, wherein:
the lower arm circuit further includes the lower arm side control circuit; and
the lower arm side control circuit further includes a current detection circuit that detects a current state of the lower arm side switching element by comparing the voltage signal with a threshold voltage.

4. The semiconductor device according to claim 3, wherein the lower arm side shunt breaking circuit is located between the low potential side terminal of the lower arm side current monitoring element and a high potential side terminal of the sense resistor.

5. The semiconductor device according to claim 4, wherein:
the upper arm side switching element is an upper arm side main metal oxide-semiconductor field-effect transistor (MOSFET) having an upper built-in diode therein;
the lower arm side switching element is a lower arm side main MOSFET having a first lower built-in diode therein;
the lower arm side current monitoring element is a sense MOSFET having a second lower built-in diode therein;
the circuit element forming the lower arm side shunt breaking circuit is another diode;
a drain of the lower arm side main MOSFET is connected to a cathode of the first lower built-in diode, a drain of the sense MOSFET, a cathode of the second lower built-in diode and the connection point;
the connection point is connected to a source of the upper arm side main MOSFET;

an anode of the another diode is connected to a source of the sense MOSFET and an anode of the second lower built-in diode;
a cathode of the another diode is connected to the high potential side terminal of the sense resistor and an input end of the current detection circuit; and
a low potential side terminal of the sense resistor is connected to a source of the lower arm side main MOSFET and an anode of the first lower built-in diode.

6. The semiconductor device according to claim 5, wherein:
the current detection circuit detects the lower arm side main MOSFET being in an overcurrent state upon detection of the voltage signal being greater than or equal to the threshold voltage, the voltage signal being generated on a basis of a voltage drop that occurs as a result of the sense current output from the sense MOSFET and flowing through the sense resistor; and
the lower arm side control circuit stops driving the lower arm side main MOSFET upon detection of the lower arm side main MOSFET being in the overcurrent state.

7. The semiconductor device according to claim 3, wherein the lower arm side shunt breaking circuit is located between the low potential side terminal of the lower arm side switching element and a low potential side terminal of the sense resistor.

8. The semiconductor device according to claim 7, wherein:
the upper arm side switching element is an upper arm side main MOSFET having an upper built-in diode therein;
the lower arm side switching element is a lower arm side main MOSFET having a first lower built-in diode therein;
the lower arm side current monitoring element is a sense MOSFET having a second lower built-in diode therein;
the lower arm side shunt breaking circuit is another diode;
a drain of the lower arm side main MOSFET is connected to a cathode of the first lower built-in diode, a drain of the sense MOSFET, a cathode of the second lower built-in diode and the connection point,
the connection point is connected to a source of the upper arm side main MOSFET;
a high potential side terminal of the sense resistor is connected to an input end of the current detection circuit, a source of the sense MOSFET and an anode of the second lower built-in diode;
an anode of the another diode is connected to the low potential side terminal of the sense resistor; and
a cathode of the another diode is connected to a source of the lower arm side main MOSFET and an anode of the first lower built-in diode.

9. The semiconductor device according to claim 8, wherein:
the current detection circuit detects that the lower arm side main MOSFET is in an overcurrent state upon detection of the voltage signal being greater than or equal to the threshold voltage, the voltage signal being generated on a basis of a voltage drop that occurs as a result of the sense current being output from the sense MOSFET and flowing through the sense resistor, and a forward voltage drop that occurs as a result of the sense current flowing through the another diode; and
the lower arm side control circuit stops driving the lower arm side main MOSFET upon detection of the lower arm side main MOSFET being in the overcurrent state.

10. The semiconductor device according to claim 1, further comprising a printed-circuit board on which the lower arm side output circuit is disposed, wherein the lower arm side shunt breaking circuit is located on the printed-circuit board, or inside the lower arm side control circuit.

11. A semiconductor device, comprising:

an upper arm circuit including an upper arm side output circuit including:

an upper arm side switching element that is switching-controlled by an upper arm side control circuit and that supplies a power to a load;

an upper arm side current monitoring element that is switching-controlled by the upper arm side control circuit and that monitors a current flowing through the upper arm side switching element; and an upper arm side shunt breaking circuit that is a circuit element that, without application of a control signal, always blocks current in one direction and allows current to pass in the opposite direction, the lower side shunt breaking circuit being electrically connected to a low potential side terminal of the upper arm side current monitoring element; and a lower arm side switching element connected in series with the upper arm side switching element, wherein the upper arm side shunt breaking circuit cuts off a shunt of a regenerative current flowing from the load to the upper arm side current monitoring element upon the lower arm side switching element changing from an on-state to an off-state, the load being connected to a high potential side terminal of the upper arm side switching element at a first end thereof, and connected to a connection point of the lower arm side switching element and the upper arm side switching element at a second end thereof.

12. The semiconductor device according to claim 11, wherein the upper arm circuit further includes a sense resistor that converts a sense current output from the upper arm side current monitoring element to a voltage signal.

13. The semiconductor device according to claim 12, wherein:

the upper arm circuit further includes the upper arm side control circuit; and the upper arm side control circuit further includes a current detection circuit that detects a current state of the upper arm side switching element by comparing the voltage signal with a threshold voltage.

14. The semiconductor device according to claim 13, wherein the upper arm side shunt breaking circuit is located between the low potential side terminal of the upper arm side current monitoring element and a high potential side terminal of the sense resistor.

15. The semiconductor device according to claim 14, wherein:

the lower arm side switching element is a lower arm side main MOSFET having a lower built-in diode therein;

the upper arm side switching element is an upper arm side main MOSFET having a first upper built-in diode therein;

the upper arm side current monitoring element is a sense MOSFET having a second upper built-in diode therein;

the upper arm side shunt breaking circuit is another diode;

a drain of the upper arm side main MOSFET is connected to a cathode of the first upper built-in diode, a drain of the sense MOSFET, a cathode of the second upper built-in diode and the first end of the load;

an anode of the another diode is connected to a source of the sense MOSFET and an anode of the second upper built-in diode;

a cathode of the another diode is connected to the high potential side terminal of the sense resistor and an input end of the current detection circuit;

a low potential side terminal of the sense resistor is connected via the connection point to a source of the upper arm side main MOSFET, an anode of the first upper built-in diode and the second end of the load; and the connection point is connected to a drain of the lower arm side main MOSFET.

16. The semiconductor device according to claim 15, wherein:

the current detection circuit detects the upper arm side main MOSFET being in an overcurrent state upon detection of the voltage signal being greater than or equal to the threshold voltage, the voltage signal being generated on a basis of a voltage drop that occurs as a result of the sense current being output from the sense MOSFET and flowing through the sense resistor is greater than or equal to the threshold voltage; and the upper arm side control circuit stops driving the upper arm side main MOSFET upon detection of the upper arm side main MOSFET being in the overcurrent state.

17. The semiconductor device according to claim 13, wherein the upper arm side shunt breaking circuit is located between a low potential side terminal of the upper arm side switching element and a low potential side terminal of the sense resistor.

18. The semiconductor device according to claim 17, wherein:

the lower arm side switching element is a lower arm side main MOSFET having a lower built-in diode therein;

the upper arm side switching element is an upper arm side main MOSFET having a first upper built-in diode therein;

the upper arm side current monitoring element is a sense MOSFET having a second upper built-in diode therein;

the upper arm side shunt breaking circuit is another diode;

a drain of the upper arm side main MOSFET is connected to a cathode of the first upper built-in diode, a drain of the sense MOSFET, a cathode of the second upper built-in diode and the first end of the load;

a high potential side terminal of the sense resistor is connected to an input end of the current detection circuit, a source of the sense MOSFET and an anode of the second upper built-in diode;

an anode of the another diode is connected to the low potential side terminal of the sense resistor;

a cathode of the another diode is connected via the connection point to a source of the upper arm side main MOSFET, an anode of the first upper built-in diode and the second end of the load; and the connection point is connected to a drain of the lower arm side main MOSFET.

19. The semiconductor device according to claim 18, wherein:

the current detection circuit detects the upper arm side main MOSFET being in an overcurrent state upon detection of the voltage signal being greater than or equal to the threshold voltage, the voltage signal being generated on a basis of a voltage drop that occurs as a result of the sense current being output from the sense MOSFET and flowing through the sense resistor, and a forward voltage drop that occurs as a result of the sense current flowing through the another diode; and the upper arm side control circuit stops driving the upper arm side main MOSFET upon detection of the upper arm side main MOSFET being in the overcurrent state.

20. The semiconductor device according to claim 11, further including a printed-circuit board on which the upper arm side output circuit is disposed, wherein the upper arm side shunt breaking circuit is located on the printed-circuit board or inside the upper arm side control circuit.

* * * * *